(12) United States Patent
Jansen

(10) Patent No.: US 9,485,967 B2
(45) Date of Patent: Nov. 8, 2016

(54) LOADING DEVICE FOR LOADING BROILERS INTO CRATES

(71) Applicant: A.H. Jansen Holding B.V., Barneveld (NL)

(72) Inventor: Albrecht Hendrik Jansen, Barneveld (NL)

(73) Assignee: A.H. Jansen Holding B.V., Barneveld (NL)

( * ) Notice: Subject to any disclaimer, the term of this patent is extended or adjusted under 35 U.S.C. 154(b) by 0 days.

(21) Appl. No.: 14/422,595

(22) PCT Filed: Aug. 23, 2013

(86) PCT No.: PCT/NL2013/050612
§ 371 (c)(1),
(2) Date: Feb. 19, 2015

(87) PCT Pub. No.: WO2014/031001
PCT Pub. Date: Feb. 27, 2014

(65) Prior Publication Data
US 2015/0208618 A1      Jul. 30, 2015

(30) Foreign Application Priority Data

Aug. 23, 2012 (NL) ...................................... 2009354

(51) Int. Cl.
*A01K 45/00* (2006.01)
(52) U.S. Cl.
CPC .................................. *A01K 45/005* (2013.01)
(58) Field of Classification Search
CPC .. A01K 45/005; A01K 31/00; A01K 31/002; A01K 31/18; A01K 31/19; B65G 21/14; B65G 41/005; B65G 41/008; B65G 67/08

USPC ........ 119/846, 843, 845, 401, 844, 330–331, 119/751, 437, 439, 722, 847; 452/53, 183
See application file for complete search history.

(56) References Cited

U.S. PATENT DOCUMENTS

| 1,910,291 | A | * | 5/1933 | Johnston | ................ | A01K 31/16 |
|           |   |   |        |          |                  | 119/330 |
| RE24,638  | E | * | 4/1959 | Parker   | ................. | B65G 47/647 |
|           |   |   |        |          |                  | 198/435 |

(Continued)

FOREIGN PATENT DOCUMENTS

| EP | 2 177 106 A1 | 4/2010 |
| WO | 03/030634 A1 | 4/2003 |

*Primary Examiner* — Joshua Huson
*Assistant Examiner* — Hiwot Tefera
(74) *Attorney, Agent, or Firm* — The Webb Law Firm

(57) ABSTRACT

The invention relates to a device for loading poultry supplied in supply stations located one above another at different heights into poultry holders placed in a loading station, wherein the device is provided with a frame, a first carriage movable on the side of the supply stations in vertical direction along the frame, a second carriage movable on the side of the loading stations in vertical direction along the frame and a transport element connected to the first and the second carriage, wherein the connection between the carriages and the associated end of the transport element is configured for relative rotation, wherein the connection between the transport element and either of the carriages is configured to allow a limited relative movement in horizontal direction and the first carriage is provided with a conveyor connecting to the supply stations for carrying the poultry onto the transport element in any position of the transport element.

13 Claims, 3 Drawing Sheets

(56) References Cited

U.S. PATENT DOCUMENTS

| | | | |
|---|---|---|---|
| 3,061,065 A * | 10/1962 | Worthington | B27L 5/002 198/435 |
| 3,672,335 A * | 6/1972 | Sanders | A01K 45/005 119/846 |
| 3,702,600 A * | 11/1972 | Bright | B65G 41/002 119/846 |
| 3,722,477 A * | 3/1973 | Weldy | B65G 21/14 119/846 |
| 4,272,863 A * | 6/1981 | Parker, Jr. | A22C 21/0007 119/716 |
| 4,301,770 A * | 11/1981 | Parker, Jr. | A01K 45/005 119/716 |
| 4,321,889 A | 3/1982 | Michaelsen et al. | |
| 4,766,850 A * | 8/1988 | O'Neill | B65G 65/06 119/846 |
| 4,838,137 A * | 6/1989 | Azuma | B29D 30/46 156/406 |
| 5,143,021 A * | 9/1992 | Shaley | A01K 31/16 119/330 |
| 5,385,117 A | 1/1995 | Hollis et al. | |
| 5,660,147 A * | 8/1997 | Wills | A01K 45/005 119/846 |
| 5,673,649 A * | 10/1997 | Duecker | A01K 31/16 119/337 |
| 5,699,755 A * | 12/1997 | Wills | A01K 45/005 119/844 |
| 5,743,217 A * | 4/1998 | Jerome | A01K 45/005 119/846 |
| 6,109,215 A * | 8/2000 | Jerome | A01K 45/005 119/843 |
| 6,234,473 B1 * | 5/2001 | Morgan | B65H 29/50 271/200 |
| 6,447,234 B2 * | 9/2002 | Sinn | A01K 45/005 119/846 |
| 6,655,897 B1 * | 12/2003 | Harwell | B60P 3/04 119/401 |
| 7,281,496 B2 * | 10/2007 | Calabria | B60P 3/04 119/401 |
| 8,794,190 B1 * | 8/2014 | Evers | A01K 29/00 119/400 |
| 9,085,435 B2 * | 7/2015 | Jiwan | B65H 29/50 |
| 2002/0072317 A1 | 6/2002 | Livingston et al. | |
| 2002/0098066 A1 * | 7/2002 | Sinn | A01K 45/005 414/345 |
| 2002/0154972 A1 | 10/2002 | Sinn et al. | |
| 2002/0179024 A1 * | 12/2002 | Anderson | A01K 45/005 119/845 |
| 2003/0057055 A1 * | 3/2003 | Haukaas | B65G 41/002 198/313 |

* cited by examiner

LOADING DEVICE FOR LOADING
BROILERS INTO CRATES

CROSS-REFERENCE TO RELATED
APPLICATIONS

This application is the United States national phase of International Application No. PCT/NL2013/050612 filed Aug. 23, 2013, and claims priority to The Netherlands Patent Application No. 2009354 filed Aug. 23, 2012, the disclosures of which are hereby incorporated in their entirety by reference.

BACKGROUND OF THE INVENTION

1. Field of the Invention

The invention relates to a loading device for loading broilers into crates. Broilers are reared in houses in rows of group accommodation systems with a bottom allowing passage of manure, wherein discharge belts for manure extend below the accommodation of the poultry. When the broilers are ready for slaughter the bottoms are removed from the accommodation systems so that the broilers drop onto the discharge belt. When the belt is activated the broilers are carried to an end of the row of the group accommodation systems. Such a system is supplied by Jansen Poultry Equipment as the Bromax system.

2. Description of Related Art

According to the prior art the broilers are picked up at the end of the row and placed in crates by hand. It is also known, among others from the Netherlands patent NL 2002093, to carry the broilers outside via a series of conveyor belts and place them in crates. This entails quite a few changes in direction of the movement to be made by the broilers, which often results in injury to the broilers. The conveyor belts also have to be guided outside through a door or a hatch in the house wall, which may result in an undesirable change of temperature in the house which has to be compensated with extra energy consumption.

The invention has for its object to provide means for automatically loading the broilers into crates inside the house. Account must be taken here of the fact that the space available at the end side of the accommodation systems is usually limited, all the more so because the supply of empty crates and the discharge of full crates also require space. There is also always a plurality of rows of accommodation systems in the sense that multiple rows of systems, each with their own discharge conveyor, are placed one above another up to as many as five or more rows high. This has the result that the broilers are delivered at different heights and the device must connect at these different heights.

The invention provides for this purpose a device for loading poultry supplied in supply stations located one above another at different heights into poultry crates placed in a loading station, wherein the device is provided with a frame, a first carriage movable on the side of the supply stations in vertical direction along the frame, a second carriage movable on the side of the loading stations in vertical direction along the frame at a horizontal distance from the first carriage, a transport element connected to the first and the second carriage and extending with a horizontal component, wherein the connection between each of the carriages and the associated end of the transport element is configured for relative rotation, wherein the connection between the transport element and either of the carriages is configured to allow a limited relative movement in horizontal direction and the first carriage is provided with a conveyor connecting to the supply stations for carrying the poultry onto the transport element in any position of the transport element.

These measures make it possible using a short transport element to discharge poultry from discharge stations located at different heights to loading stations. This is because the short length of the transport element causes considerable changes in the length of the transport element in horizontal direction when it connects to supply stations located at different heights, so that without the measures according to the invention the distance between the transport element and the poultry crates placed on the loading stations is considerable, which makes automatic loading of the poultry crates difficult or impossible. It is also noted that the poultry crates usually have different layers or tiers so that height differences also occur on the side of the poultry crates. The measures according to the invention also avoid the problems this creates. It is noted that, while both carriages are movable for the purpose of adjustment to the different supply stations, they are also fixable during the loading process.

According to a first preferred embodiment, the connection between the first carriage and the transport element is configured to allow a limited movement in horizontal direction, as this is structurally attractive.

According to a further attractive embodiment, the connection between the carriage and the transport element allowing a limited relative movement in horizontal direction comprises a lever connected rotatably to the carriage and to an end of the transport element.

In order to make the effective length of the transport element as great as possible and the variation in the angle of inclination as small as possible, the connection between the second carriage and the transport element lies on the side of the second carriage remote from the first carriage.

According to another preferred embodiment, the transport element comprises a carrier connected to the first and the second carriage, a conveyor belt is mounted on the carrier and the first carriage is provided with a conveyor leading to a position above the conveyor belt.

The second carriage is preferably also connected to uprights extending at a distance from the loading station and forming part of the frame. The carriage extends here from the uprights to the vicinity of the loading station, wherein the carriage is connected close to the loading station to the conveyor belt carrier. Variation in the horizontal position of the delivery end of the conveyor belt is hereby prevented. The uprights along which the second carriage is movable are preferably placed some distance from the loading station so as to provide space for personnel monitoring and controlling loading of the poultry. The frame is provided here with two uprights along which the first carriage is movable in guided manner in vertical direction, and the frame is provided with two uprights along which the second carriage is movable in vertical direction.

For driving of the second carriage in vertical direction use is preferably made of a winch with which the second carriage can be raised or the position of which can be lowered when the winch cable is payed out. A high speed is required during the change in position of this carriage since the poultry is preferably loaded without interruption into the different tiers of the poultry crates, and the transition between one tier and the next must therefore take place quickly. A rapid driving can also be obtained by means of a spring-loaded drive, applying a counterweight or a linear drive member such as a hydraulic cylinder or an air cylinder.

The first carriage must connect to the supply stations. No personnel need be present here so that the uprights which form part of the frame and along which the first carriage is movable can be placed directly against the loading stations.

Less stringent standards are required of the driving of the first carriage in vertical direction because it is displaced less often, i.e. only when emptying of a whole row of accommodation systems is completed.

There are poultry crates which are provided with mutually adjacent compartments. In order to enable successive loading of such mutually adjacent compartments lying at the same height without displacing the poultry crate, it can be attractive to embody the conveyor belt for pivoting about a vertical axis. This axis will preferably be located here close to the side of the loading station so as to hold the start of the conveyor belt in its place. The frame, the conveyor belt carrier and the carriages will in any case have to be modified to enable such a pivoting of the conveyor belt. This measure otherwise provides the option of placing two poultry crates adjacently of each other, initially filling one of these crates and then the second, wherein the first crate is replaced by an empty crate after it has been filled, and so on. The conveyor belt is thus connected for pivoting about a vertical axis to the carrier.

The above stated possibilities can also be provided by allowing the loading station or the loading stations to be movable in the transverse direction, i.e. transversely of the direction of transport of the conveyor belt. Other crates can hereby be placed in front of the delivery end of the conveyor belt. In order to not interrupt the transport of the broilers here either, it is recommended that this movement of the crate takes place quickly. It is important for this purpose that in the direction in which the crate is moved there is sufficient space in which the crate can be moved in rapid manner.

The measures described up to this point relate to a device provided with a single conveyor belt. It is possible to place more than one conveyor belt one above another in the same frame so that more than one row of cages can be emptied simultaneously. This will of course require the presence of multiple loading stations which lie one above another and in each of which a poultry crate can be placed. It is also attractive for a platform on which a person can monitor and control the loading process to be present at each of the loading stations. A further embodiment provides for this purpose the measure that the device is provided with more than one first carriage movable on the side of the supply stations in vertical direction along the frame, more than one second carriage movable on the side of the loading stations in vertical direction along the frame at a horizontal distance from the first carriage, and more than one transport element connected to the first and the second carriage.

Because the accommodation systems only have to be emptied several times a year, it is recommended to make the device displaceable so that it can be coupled to the end side of different rows. The frame can be provided for this purpose with wheels, such as swivel wheels. It may after all be necessary, depending on the configuration of the supply stations and the loading stations, to displace the device over short distances in the direction of movement of the conveyor belt, this in addition to the 'normal' movement of the device between the different rows of systems. It is also possible to envisage use being made of rails over which the wheels of the device travel, or other guide means, but wherein means must be provided for moving the device in the transverse direction. Means must of course be provided for fixing the device during the loading process. These means can comprise jacks, but can likewise comprise coupling means for coupling the device to the supply stations.

The above described measures relate to a single device provided with a single conveyor belt. As will be elucidated below with reference to the drawings, it is possible to apply a plurality of devices wherein two or more conveyor belts and the associated auxiliary devices are placed one above another so that multiple rows of accommodation systems with poultry can be emptied simultaneously. Although it is possible to envisage poultry from different rows being guided to the same poultry crate, this is structurally less attractive, and it is therefore recommended that multiple poultry crates are placed one above another which are filled simultaneously.

For the purpose of supplying empty poultry crates to the loading stations and discharging full poultry crates from the loading stations use can be made of classical transport means such as forklift trucks, although it is likewise possible for this purpose to make use of conveyor belts, which in that case extend transversely of the longitudinal direction of the rows of accommodation systems.

For transport of the poultry to the supply stations use is preferably made, as already elucidated, of manure belts. Before the poultry is carried to the supply station it is therefore recommended that the manure belt moves in order to discharge as much manure as possible. When the poultry is then supplied, it is not always possible however to prevent manure also being supplied. In order to separate the animals from the manure use can be made of a funnel-like construction placed some distance above the manure belt, whereby the animals are urged toward the middle of the belt. The manure which has passed the funnel on the underside and is present on the side strips can then be removed by a scraping device or other device present further down the belt. A further embodiment thus provides the measure that a converging structure is arranged above the supply belt and at some distance from the supply belt for guiding the poultry to a part of the belt. It is also recommended that a scraping device be placed above the belt downstream of the converging structure.

It may then be attractive to provide the device with a counting device for counting the animals loaded into the crates. Because of the usually high speed, an optical counting device is the most attractive. Use can particularly be made here of a camera which detects the animals during transport and which is coupled to an image processing device for the purpose of distinguishing and counting the individual animals.

The problem occurs, particularly in the case of multilayer systems, that it is difficult to remove the manure from the conveyor belt in the accommodation system prior to the discharge of the poultry, whereby it can occur that the animals are carried together with the manure to the device according to the invention. In order to prevent this, it is attractive to provide means for disposing of manure without it entering the loading device according to the invention. A preferred embodiment of the invention provides for this in that the travel direction of the conveyor belt is reversible. Associated with this, a method is provided with which the manure discharge belt and the conveyor are initially activated and the conveyor belt according to the invention is moved in reverse direction. The manure is then discharged through the gap between the conveyor and the conveyor belt. It is also possible to reverse the direction of movement of the conveyor, whereby the manure is discharged between the manure discharge belt and the conveyor.

According to a further structurally attractive embodiment, a single drive is provided for the conveyor belt and the conveyor. The conveyor belt is preferably driven and the conveyor belt drives the conveyor. It is attractive for this purpose for the driven shaft of the conveyor to be coupled to a shaft of the conveyor belt. This coupling can take place in that mutually engaging toothed wheels are provided on both shafts, possibly via one or two interposed toothed wheels, or in that they are coupled by a belt or chain connection. Account must be taken here of the fact that the linear speed of the conveyor and the conveyor belt is preferably the same or substantially the same. It is likewise possible to drive the conveyor. The use of a freewheel mechanism has the advantage that, when the direction of the conveyor or the conveyor belt is reversed, the other of these two elements is not driven, this being important in the above elucidated situation wherein manure is discharged prior to filling of the crates with poultry.

BRIEF DESCRIPTION OF THE DRAWINGS

The invention will be further elucidated hereinbelow with reference to the accompanying drawings, in which.

DETAILED DESCRIPTION OF THE INVENTION

Figure 1:
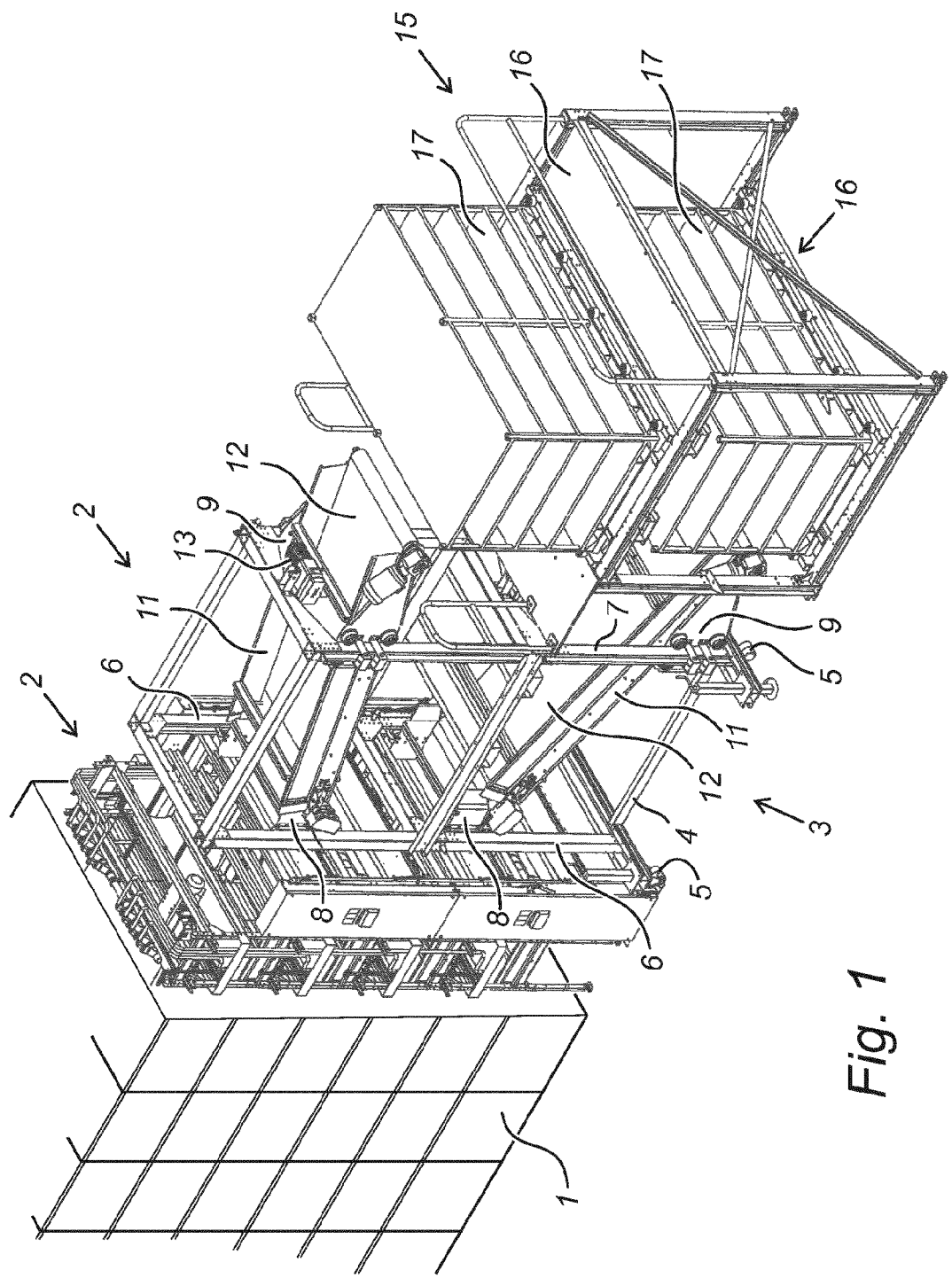
FIG. 1 shows a perspective schematic view of a loading device according to the invention.
Figure 2:
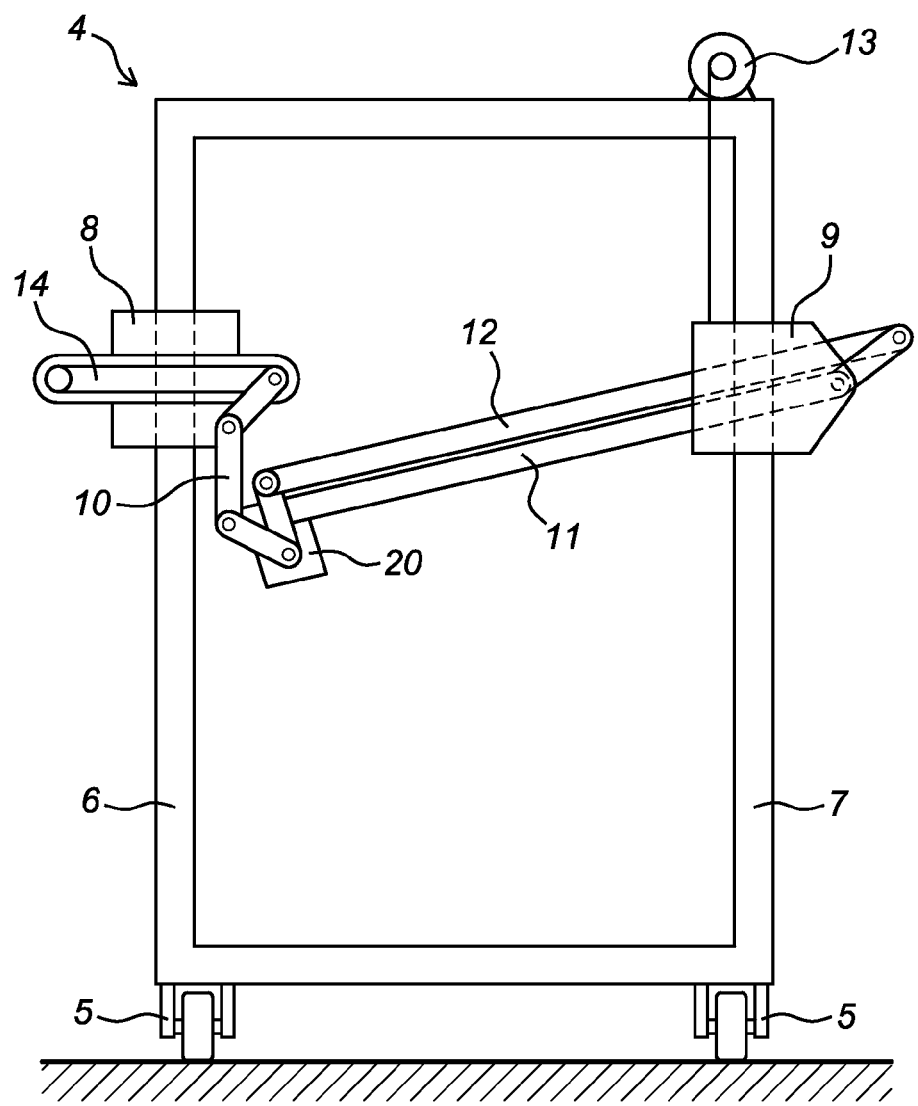
FIG. 2 is a cross-sectional view of a part of the device shown in FIG. 1.

FIG. 1 shows a ground surface on which are placed three series of poultry accommodation systems 1, each with four rows placed on each other, of which one series is shown in the drawing. Each of the rows of poultry accommodation systems 1 ends at a supply station 2. The device comprises a loading device 3 which is placed in front of the left-hand series of supply stations 2. Loading device 3 comprises a rectangular frame 4 which is provided on its underside with wheels 5. Frame 4 comprises two rear uprights 6 and two front uprights 7. A carriage 8 consisting of two parts is placed between the rear uprights 6 and a carriage 9 consisting of two parts is placed between front uprights 7. Carriage 9 can move in vertical direction along uprights 7 of frame 4 when driven by a winch 13 connected by means of a cable to carriage 9. Two levers 10 are mounted rotatably on carriage 8, while the underside of levers 10 is connected rotatably to a conveyor belt carrier 11 in which a conveyor belt 12 is placed. This construction is shown in more detail in FIG. 2. The other end of the conveyor belt carrier 11 is connected rotatably to carriage 9, and to the part of carriage 9 situated as close as possible to the loading station but at the greatest possible distance from upright 7.

FIG. 1 also shows a small conveyor belt 14 which is arranged on first carriage 8 and which serves to transfer the poultry from the supply belt for the poultry to the conveyor belt. It is important here that the small conveyor belt 14 extends to a position above conveyor belt 12 in order to ensure a good transfer of the poultry. For driving of the conveyor belt 12 mounted on the conveyor belt carrier 11 use is made of an electric motor 20 which is placed on the conveyor belt carrier 11 and which also drives the small conveyor belt 14 arranged on first carriage 8, although it is also possible that the electric motor 20 is placed on first carriage 8 and drives both conveyor belts 11, 12. In order to have driving take place over the connection between carriage 8 and conveyor belt carrier 11, use can be made of toothed wheels placed at the rotation points between levers 10 and respectively the carriage 8 and the conveyor belt carrier 12, possibly supplemented with toothed wheels placed between these toothed wheels and mounted on the lever, although it is likewise possible to make use of a transmission with a chain or with a toothed belt.

FIG. 1 also shows a loading station 15 comprising two platforms 16 for poultry crates 17. A poultry crate 17 is placed on each of the platforms 16. Poultry crates 17 are each provided with four spaces placed one above another. Each of these spaces is filled successively with poultry, wherein the height of conveyor belt 12 is adjusted quickly between filling of the spaces, for which purpose use is made of winch 13 connected to carriage 9.

It is noted that an embodiment is shown in FIG. 1 wherein two first and second carriages and two conveyor belt carriers with associated conveyor belts are placed in a single frame 4.

Figure 3:
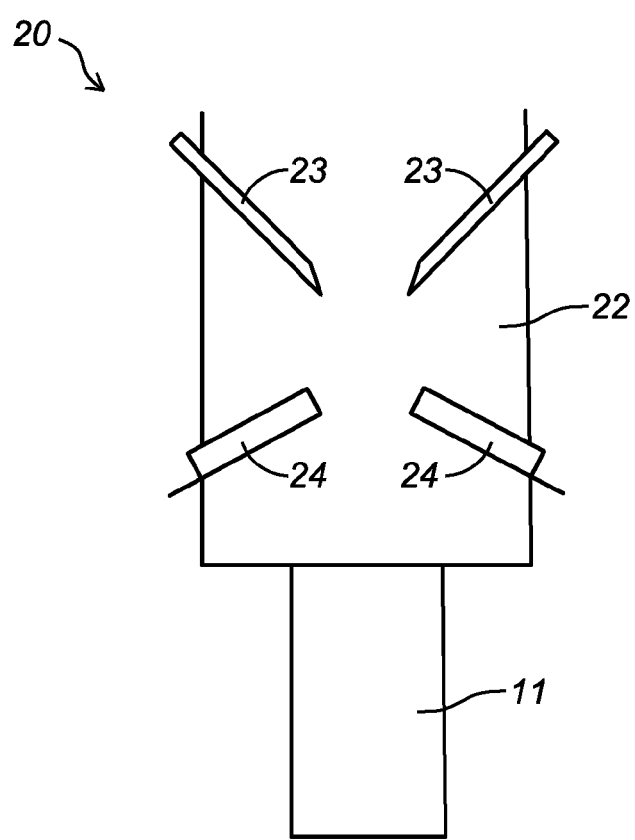
FIG. 3 shows a top view of a supply belt of a poultry accommodation system according to the invention.

Finally, FIG. 3 shows a top view of a supply belt 22, also designated a manure discharge belt of a poultry accommodation system 1. Supply belt 22 leads to a position above the small conveyor belt 11 placed in first carriage 8. Since this belt is normally used as manure discharge belt, it is not possible to prevent the animals in the cages which have not yet been emptied depositing manure on the belt. In order to separate manure and poultry, use can be made of two guides 23 which guide the poultry to the middle of the belt so that the remaining parts of the belt can be cleared of manure by means of scrapers 24.

As a result of these measures the transport of the animals for slaughter from their cage to the poultry crate takes place quickly without too many changes of direction, which usually result in injuries to the animals.

The invention claimed is:

1. A device for loading poultry supplied in supply stations located one above another at different heights into poultry holders placed in a loading station, wherein the device comprises:
a frame;
a first carriage movable on the side of the supply stations in vertical direction along the frame;
a second carriage movable on the side of the loading stations in vertical direction along the frame at a horizontal distance from the first carriage;
a transport element connected to the first and the second carriage and extending with a horizontal component;
wherein the connection between each of the carriages and the associated end of the transport element is configured for relative rotation;
wherein the connection between the transport element and either of the carriages is configured to allow a limited relative movement in horizontal direction; and
the first carriage is provided with a conveyor connecting to the supply stations for carrying the poultry onto the transport element in any position of the transport element.

2. The device as claimed in claim 1, wherein the connection between the first carriage and the transport element is configured to allow a limited movement in horizontal direction.

3. The device as claimed in claim 2, wherein the connection between the second carriage and the transport element lies on the side of the second carriage remote from the first carriage.

4. The device as claimed in claim 1, wherein the connection between the first carriage and the transport element allowing a limited relative movement in horizontal direction comprises a lever connected rotatably to the first carriage and to an end of the transport element.

5. The device as claimed in claim 1, wherein the transport element comprises a carrier connected to the first and the second carriages, that a conveyor belt is mounted on the carrier and that the first carriage is provided with the conveyor leading to a position above the conveyor belt.

6. The device as claimed in claim 5, wherein a single motor is arranged for driving the conveyor belt and the conveyor.

7. The device as claimed in claim 1, wherein the frame is provided with two uprights along which the first carriage is movable in guided manner in vertical direction, and that the frame is provided with two uprights along which the second carriage is movable in vertical direction.

8. The device as claimed in claim 7, wherein the device comprises a winch with cable, the end of which is connected to the second carriage.

9. The device as claimed in claim 7, wherein the transport element comprises a carrier connected to the first and the second carriages, a conveyor belt is mounted on the carrier, the first carriage is provided with the conveyor leading to a position above the conveyor belt, and the conveyor belt is connected for pivoting about a vertical axis to the carrier.

10. The device as claimed in claim 1, wherein the device is displaceable in the direction transversely of the direction of transport of the transport element by means of wheels arranged on the underside of the frame.

11. The device as claimed in claim 1, wherein the device is provided with more than one first carriage movable on the side of the supply stations in vertical direction along the frame, more than one second carriage movable on the side of the loading stations in vertical direction along the frame at a horizontal distance from the first carriage, and more than one transport element connected to the first and the second carriage.

12. The device as claimed in claim 1, wherein a converging structure is arranged above a supply belt and at some distance from the supply belt for guiding the poultry to a part of the supply belt.

13. The device as claimed in claim 12, wherein a scraping device is placed above the supply belt downstream of the converging structure.

* * * * *